(12) United States Patent
Iguchi et al.

(10) Patent No.: US 6,170,923 B1
(45) Date of Patent: Jan. 9, 2001

(54) MALFUNCTION DETECTION DEVICE AND METHOD FOR A WHEEL SPEED SENSOR

(75) Inventors: Yutaka Iguchi; Teruaki Akata, both of Aichi-ken (JP)

(73) Assignee: Aisin Seiki Kabushiki Kaisha, Kariya (JP)

(*) Notice: Under 35 U.S.C. 154(b), the term of this patent shall be extended for 0 days.

(21) Appl. No.: 09/138,576

(22) Filed: Aug. 24, 1998

(30) Foreign Application Priority Data

Aug. 25, 1997 (JP) .................................................. 9-228448

(51) Int. Cl.[7] .................................................. B60T 8/88
(52) U.S. Cl. ........................................ 303/122.04; 324/166
(58) Field of Search .................. 303/122.04, 122.05; 324/160, 161, 163, 164, 165, 166, 167, 168, 173, 174, 175, 177, 178, 179, 180; 73/488, 481, 491–498, 504.01–504.16, 507–512, 514.39, 519.01, 520.01

(56) References Cited

U.S. PATENT DOCUMENTS 5,130,933 * 7/1992 Kitano .................................. 324/160
5,510,707 * 4/1996 Caron .................................. 324/166

\* cited by examiner

*Primary Examiner*—Christopher P. Schwartz
*Assistant Examiner*—Robert A. Siconolfi
(74) *Attorney, Agent, or Firm*—Sughrue, Mion, Zinn, Macpeak & Seas, PLLC

(57) ABSTRACT

A malfunction detection device for a wheel speed sensor includes a comparison circuit for comparing a wheel speed signal output from a wheel speed sensor with a predetermined voltage. A calculation circuit is provided for selectively increasing or decreasing a counter according to an output signal of the comparison circuit. A malfunction signal output circuit outputs a malfunction signal when the counter of the calculation circuit reaches a predetermined value.

4 Claims, 5 Drawing Sheets

MALFUNCTION DETECTION DEVICE AND METHOD FOR A WHEEL SPEED SENSOR

BACKGROUND OF THE INVENTION

CROSS-REFERENCE TO RELATED APPLICATION

The present application is based on Japanese Patent Application No. 09 (1997)-228448, the entire disclosure of which is incorporated herein by reference.

1. Field of the Invention

The present invention generally relates to a malfunction detection device and method of operation for a wheel speed sensor.

2. Description of the Related Art

A wheel speed sensor for a vehicle is conventionally included in an anti-skid control device, a traction control device for a vehicle and so on. Since, in this case of malfunction of the wheel speed sensor, the control device for a vehicle can not control the vehicle, the malfunction of the wheel speed sensor must be precisely detected.

With reference to the detection of the malfunction of the wheel speed sensor, conventionally a controller compares the direct current flowing in a wheel speed sensor with a predetermined value in order to detect a cut wire or a short circuit of a wire of the wheel speed sensor.

In accordance with the conventional malfunction detection device for a wheel speed sensor, when the controller detects the malfunction of the wheel speed sensor, a real rotation of a wheel of the vehicle imposes a wheel speed signal current on the direct current so that the amount of the electric current momentarily rises to a predetermined value. Therefore, the controller incorrectly detects the malfunction of the wheel speed sensor.

A CR-filter which is formed with a capacitor and a resistance is mainly used in order to prevent the amount of the electric current from exceeding a predetermined value. A conventional malfunction detection device for a wheel speed sensor comprising the above CR-filter (shown in FIG. 5 of the present application) is disclosed in Japanese Patent Laid-Open No. 5 (1993)-133962.

In FIG. 5, a wheel speed signal is transmitted to a control circuit 30 from a wheel speed sensor 1 so as to be input to a micro computer through a CR-filter formed with a resistance R1 and a capacitor C1. The control circuit 30 compares the amount of the wheel speed signal with a predetermined value in order to detect the malfunction of the wheel speed sensor 1.

In accordance with FIG. 5, electronic elements of the malfunction detection circuit 31 except the capacitor C1 can be integrated. However, since the capacitor C1 must have a large capacitance, the capacitor C1 is difficult to be integrated so that the capacitor C1 is separate from the integrated circuit as a discrete part. Therefore, the space in which the electronic parts of the malfunction detection device are disposed for a wheel speed sensor must be enlarged. Further, the malfunction detection device for such a wheel speed sensor will be high in cost.

In order to solve the above problem, the wheel speed signal may be directly input into an A/D converter of the micro computer so that the wheel speed signal passes through a digital filter in the micro computer. Since the wheel speed sensor outputs a wheel speed signal of about 0~10 k Hz frequency, the A/D converter must be able to treat a high frequency signal of at least 20 k Hz.

Therefore, the micro computer will be high in cost in order to treat the high frequency signal.

SUMMARY OF THE INVENTION

It is an object of the present invention to provide a malfunction detection device and method for a wheel speed sensor which is low in cost.

To achieve the above mentioned object, a malfunction detection device for a wheel speed sensor in accordance with this invention comprises a comparison circuit for comparing a wheel speed signal output from a wheel speed sensor with a predetermined voltage, a calculation circuit selectively increasing or decreasing a counter according to an output signal of the comparison circuit and a malfunction signal output circuit outputting a malfunction signal when the counter of the calculation circuit exceeds to a predetermined value.

BRIEF DESCRIPTION OF THE DRAWINGS

The features and advantages of the malfunction detection device and its method for a wheel speed sensor according to the present invention will be more clearly appreciated from the following description in conjunction with the accompanying drawings wherein.

DESCRIPTION OF THE PREFERRED EMBODIMENT

Figure 1:
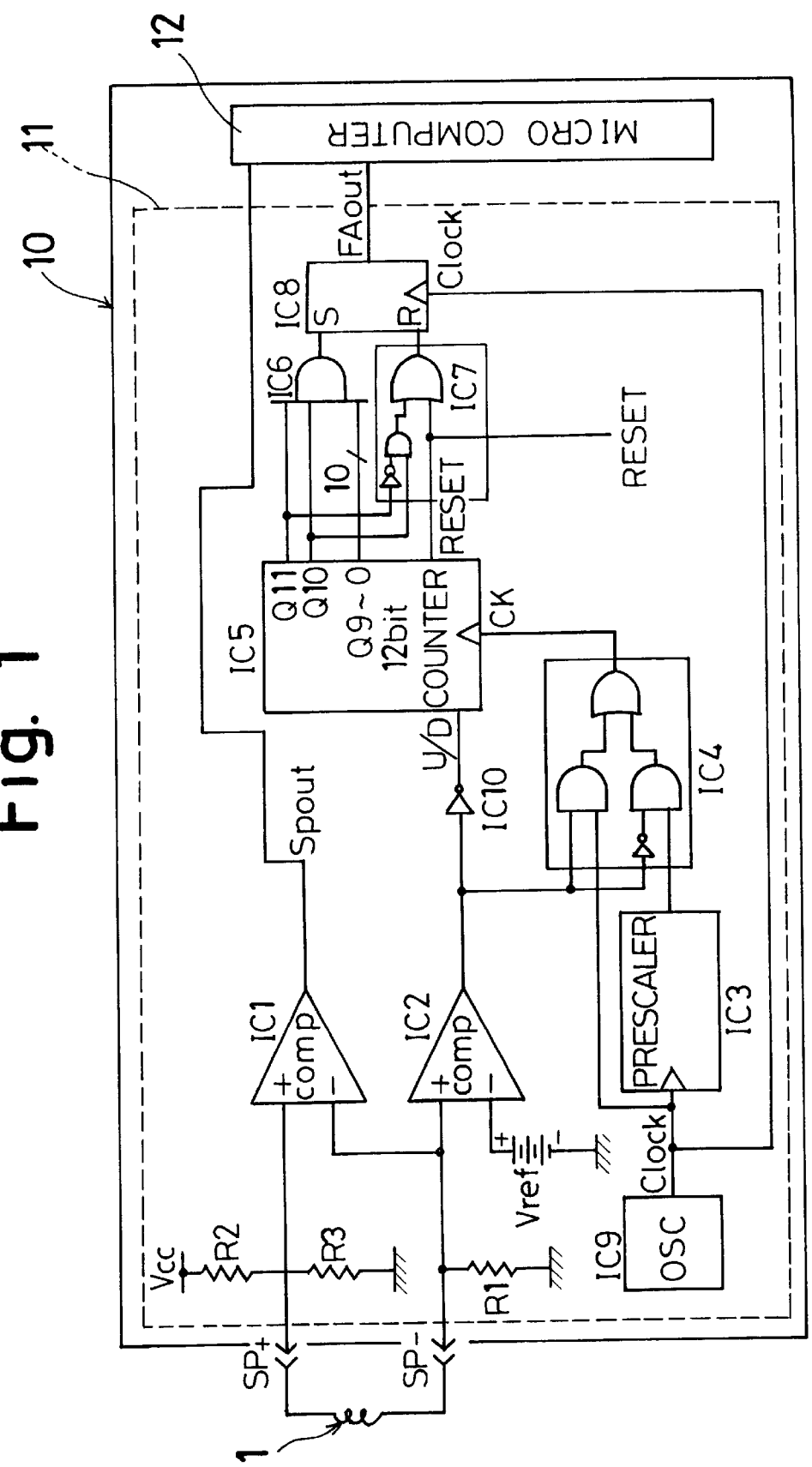
FIG. 1 is a circuit diagram of the malfunction detection device for a wheel speed sensor of the present invention.

In FIG. 1, an ABS control device 10 including a wheel speed sensor malfunction detection circuit is disclosed. An electromagnetic induction type (which is equivalent to a pick up type) wheel speed sensor 1 which is disposed near a wheel of a vehicle outputs a sinusoidal signal (a wheel speed signal) according to rotation of a sensor rotor which is rotated with the wheel integrally.

The wheel speed signal is input into a micro computer 12 through input terminals SP+, SP− of the ABS control device 10. The voltages at the input terminals SP+, SP− are compared each other in the ABS control device 10 so as to send a pulse signal Spout to the micro computer 12. The micro computer 12 calculates the wheel speed based on the frequency of the pulse signal Spout.

The detail of the wheel speed sensor malfunction detection circuit 11 will be described hereinafter. As shown in FIG. 1, the wheel speed sensor malfunction detection circuit 11 includes resistances R1~R3, comparison circuits IC1, IC2 comparing the wheel speed signal with the predetermined voltage, a calculation circuit IC5 including a binary up-down counter with 12 bit, a flip-flop circuit IC8 sending a malfunction signal FAout to the micro computer 12, an oscillator IC9, a prescaler IC3 changing the interval between clock pulses sent from the oscillator IC9, a select circuit IC4 selecting one of the clock pulses generated by the oscillator IC9 and the prescaler IC3 and sending a clock pulse signal to the calculation circuit IC5, logic circuits IC6, IC7 and an inverter IC10.

One end of the wheel speed sensor 1 is connected to a +terminal of the comparison circuit IC1 and the other end of the wheel speed sensor 1 is connected to a −terminal of the comparison circuit IC1. Further, the other end of the wheel speed sensor 1 is connected to a −terminal of the comparison circuit IC2 and a −terminal of the comparison circuit IC2 is connected to a predetermined voltage Vref. An output terminal of the comparison circuit IC2 is connected to a U/D terminal of the calculation circuit IC5 through the inverter IC10.

A resistance R1 is a pull down resistance in order to pull down the terminal SP− to 0 V when at least one of a coil wire of the wheel speed sensor 1 and a wire connecting the wheel speed sensor 1 to the ABS control device 10 is cut.

The comparison circuit IC2 compares a voltage at the terminal SP− with a predetermined voltage Vref. The comparison circuit IC2 outputs a high voltage signal (H level signal) when the voltage at the terminal SP− is larger than Vref and outputs a low voltage signal (L level signal) when the voltage at the terminal SP− is smaller than Vref. The H level signal and the L level signal are input into the U/D terminal of the calculation circuit IC5 through the inverter IC10 so as to be inverted.

The comparison circuit IC1 compares a voltage at the terminal SP+ with the voltage at the terminal SP−. The comparison circuit IC1 outputs a high voltage signal (H level signal) when the voltage at the terminal SP+ is larger than the voltage at the terminal SP− and outputs a low voltage signal (L level signal) when the voltage at the terminal SP+ is smaller than the voltage at the terminal SP− to the micro computer 12.

The oscillator IC9 outputs a clock pulse with a constant frequency Fclock. The frequency Fclock of a partial clock pulse is divided into Fclock/n (n is a natural number which is not less than 2) by the prescaler IC3. The prescaler IC3 outputs a pulse signal with a frequency Fc.

The select circuit IC4 is formed with AND circuits, an OR circuit and an inverter so as to select one of the clock pulses of the frequencies Fclock and Fc to the calculator IC5. That is to say, the select circuit IC4 selects the clock pulse of the frequency Fclock when the comparison circuit IC2 outputs H level signal and the select circuit IC4 selects the clock pulse of the frequency Fc when the comparison circuit IC2 outputs L level signal.

The calculation circuit IC5 increases the counter every time the clock pulse is input into a CK terminal of the calculation circuit IC5 when H level signal is input into the U/D terminal of the calculation circuit IC5 (When L level signal is output from the comparison circuit IC2.).

The calculation circuit IC5 decreases the counter every time the clock pulse is input into a CK terminal of the calculation circuit IC5 when L level signal is input into the U/D terminal of the calculation circuit IC5 (When H level signal is output from the comparison circuit IC2.).

The calculation circuit IC5 stops decreasing the counter at $000 and stops increasing the counter at $FFF. The counter of the calculation circuit IC5 is reset by RESET signal so as to be initialized to $000.

The logic circuits IC6, IC7 output signals based on the counter value of the calculation circuit IC5 to the flip-flop circuit IC8. The logic circuit IC6 sets a RS flip-flop terminal S of the flip-flop circuit IC8 so as to detect a malfunction of the wheel speed sensor 1 when the counter value of the calculation circuit IC5 is $FFF. The logic circuit IC7 resets the reset terminal R of the flip-flop circuit IC8 so as to detect the normality of the wheel speed sensor 1 when the counter value of the calculation circuit ICS is $400~$7FF or when a reset signal is received. The flip-flop circuit IC8 maintains the present condition thereof when no signal is received from the logic circuits IC6, IC7. The flip-flop circuit IC8 is synchronized with the clock pulse having the frequency Fclock in order to prevent the flip-flop circuit IC8 from being incorrectly operated by an error signal from one of the logic circuits IC6, IC7.

In accordance with FIG. 2, an operation of the wheel speed sensor malfunction detection circuit 11 will be described hereinafter. When the wheel speed sensor 1 is normal, the wheel speed sensor 1 sends a sinusoid signal having an average voltage Vavg to the ABS control device 10 (see ① in FIG. 2). The average voltage Vavg is determined by the resistances R1, R2, R3, a power supply Vcc and a resistance Rsen included in the wheel speed sensor 1 so as to be formulated as the following equation.

$$Vavg = Vcc\left(1 - \frac{R2}{\{R3 // (Rsen + R1)\} + R2}\right)$$

$$R3 // (Rsen + R1) = \frac{R3 - (Rsen + R1)}{R3 + (Rsen + R1)}$$

The comparison circuit IC2 outputs H level signal by the comparison between the voltage at the terminal Sp− and the voltage Vref when the voltage at the terminal Sp− is larger than the voltage Vref. The H level signal is inverted by the inverter 1010 so as to be transformed into L level signal (see ② in FIG. 2). Since the comparison circuit IC2 outputs H level signal, the clock pulse having the frequency Fclock is input into the CR terminal of the calculation circuit IC5 through the select circuit IC4. On the other hand, because the WD terminal of the calculation circuit IC5 receives L level signal, the calculation circuit IC5 maintains the counter value to $0 (see ③ in FIG. 2). The flip-flop circuit IC8 outputs L level signal from the Faout terminal so as to indicate normality of the wheel speed sensor 1 (see ⑩ in FIG. 2) since the reset signal is input into reset terminal R through the logic circuit IC7.

When the voltage at the terminal Sp− is decreased so as to be smaller than the voltage Vref (see ④ in FIG. 2), the comparison circuit IC2 outputs L level signal by the comparison between the voltage at the terminal Sp− and the voltage Vref. The L level signal is inverted by the inverter IC10 so as to be transformed into H level signal (see ⑤ in FIG. 2). Since the comparison circuit IC2 outputs L level signal, the clock pulse having the frequency Fc is input into the OK terminal of the 10 calculation circuit IC5 through the prescaler IC3 and the select circuit IC4. On the other hand, because the U/D terminal of the calculation circuit IC5 receives H level signal, the calculation circuit IC5 slowly increases the counter value (see ⑥ in FIG. 2). Since the period of time during which the voltage at the terminal Sp− is smaller than the voltage Vref is short, the voltage at the terminal Sp− increases so as to exceed to the voltage Vref before the counter value of the calculation circuit IC5 reaches $FFF (see ⑧ in FIG. 2).

When the voltage at the terminal Sp− reaches the voltage Vref, the comparison circuit IC2 changes L level signal into H level signal output thereof. Therefore, L level signal is input into the U/D terminal of the calculation circuit IC5 (see ⑧ in FIG. 2) and the clock pulse having the frequency Fclock is input into the CK terminal of the calculation circuit IC5 so as to decrease the counter value of the calculation circuit IC5 with a speed which higher than that of the increment of the counter value of the calculation circuit IC5 (see ⑨ in FIG. 2).

When the wheel is rotated at very low speed, an amplitude (the voltage) of the output signal of the wheel speed signal 1 is small. Therefore, the voltage at the terminal Sp− is not small relative to the voltage Vref so as not to incorrectly detect the malfunction of the wheel speed sensor 1.

Figure 2:
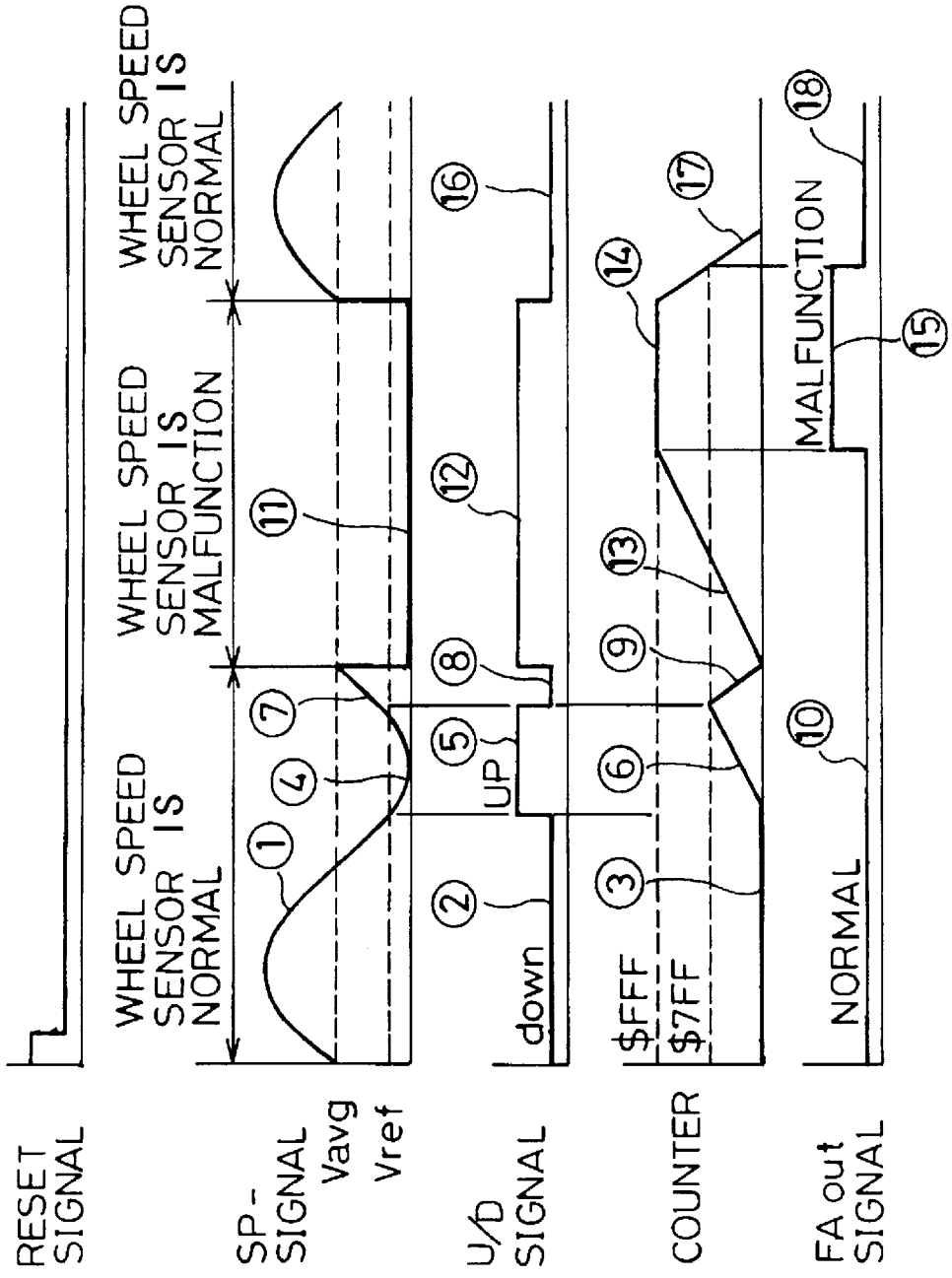
FIG. 2 is a time chart illustrating the signals of the malfunction detection device for a wheel speed sensor of the present invention when the wheel speed sensor is under a normal condition and a malfunction condition.

When the coil wire of the wheel speed sensor 1 is cut, the voltage at the terminal Sp− is pull down to 0 V by the pull down resistance R1 (see ⑪ in FIG. 2). Therefore, the comparison circuit IC2 outputs L level signal and the clock pulse having the frequency Fc is input into the CK terminal of the calculation circuit IC5 through the prescaler IC3 and the select circuit IC4. On the other hand, because the U/D terminal of the calculation circuit IC5 receives H level signal (see ⑫ in FIG. 2) the calculation circuit IC5 slowly increases the counter value (see 13 in FIG. 2).

When the counter value of the calculation circuit ICS reaches to $FFF, the calculation circuit IC5 stops increasing the counter value (see ⑭ in FIG. 2). At this moment, all of the terminals Q0~Q11 output H level signal so as to input H level signal into the R flip-flop terminal of the flip-flop circuit IC8 from the logic circuit IC6.

Consequently, the flip-flop circuit IC8 outputs H level signal from the FAout terminal thereof to indicate the malfunction of the wheel speed sensor 1 (see 15 in FIG. 2).

Later, when the normality of the wheel speed sensor 1 is recovered, the comparison circuit IC2 changes L level signal into H level signal output thereof. Therefore, L level signal is input into the U/D terminal of the calculation circuit IC5 (see ⑯ in FIG. 2) and the clock pulse having the frequency Fclock is input into the CK terminal of the calculation circuit IC5 so as to decrease the counter value of the calculation circuit ICS with a speed which higher than that of the increment of the counter value of the calculation circuit IC5 (see ⑰ 1 in FIG. 2). When the counter value of the calculation circuit IC5 decreases to $7FF, the logic circuit IC7 resets the reset terminal R of the flip-flop circuit IC8 50 that the flip-flop circuit IC8 changes H level signal into L level signal output from the FAout terminal (see ⑱ in FIG. 2).

The reason that the speeds of the increment and the decrement of the counter value of the calculation circuit IC5 are different from each other will be described hereinafter.

If the sensor rotor (not shown) which is opposite to the wheel speed sensor 1 is deformed or incorrectly mounted on the wheel of the vehicle so as not to be in the right place relative to the wheel speed sensor 1, the sinusoid Al signal generated by the wheel speed sensor 1 is deformed.

Figure 3:
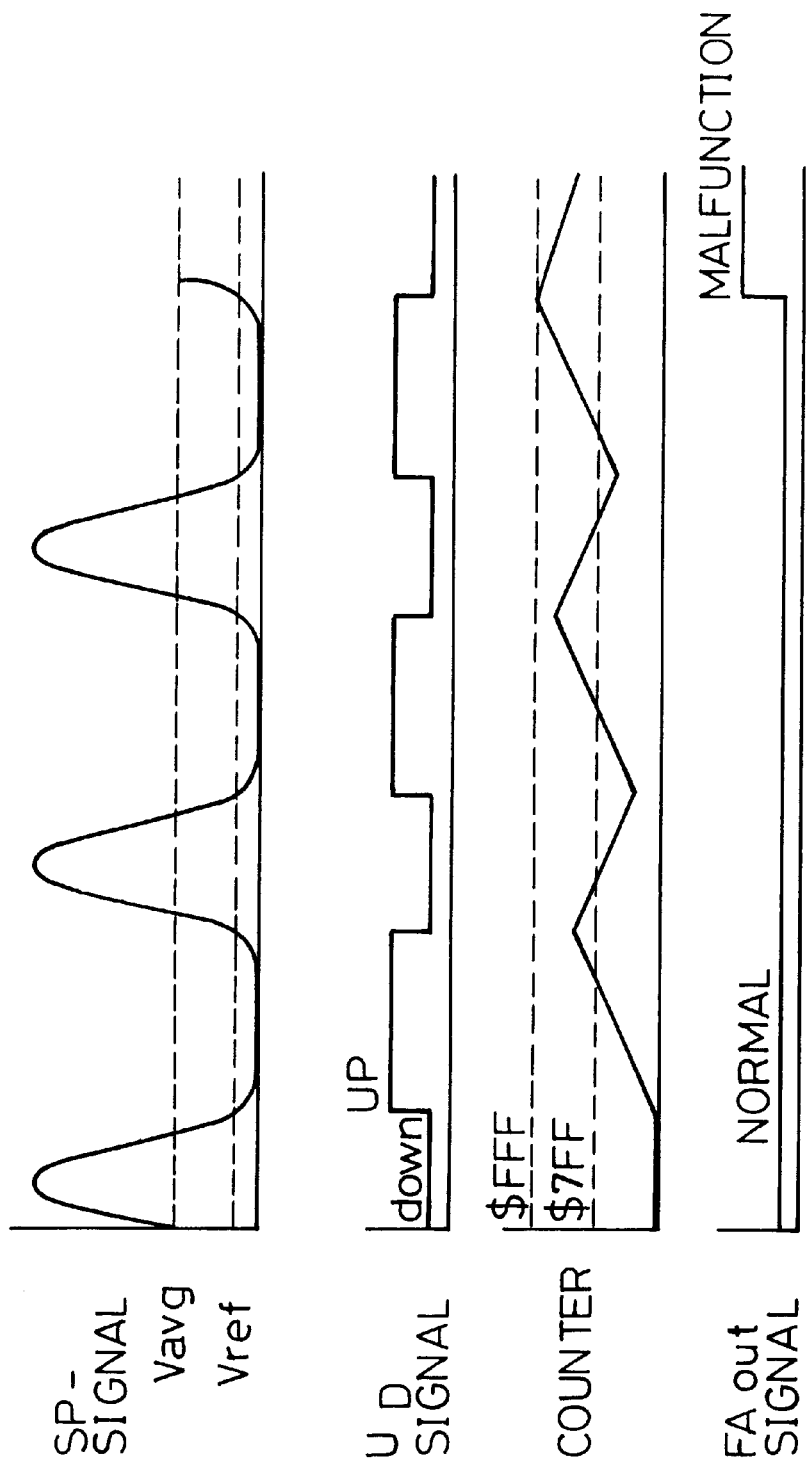
FIG. 3 is a time chart showing the signals of the malfunction detection device for a wheel speed sensor of the present invention when the wheel speed sensor rotor is deformed.

As shown in FIG. 3, if a deformed signal which is not symmetrical about the average voltage line vavg is input into the comparison circuit IC2, the increments of the counter value are accumulated so as to incorrectly detect the malfunction of the wheel speed sensor 1 when the speeds of the increment and the decrement of the counter value of the calculation circuit IC5 are substantially the same.

Figure 4:
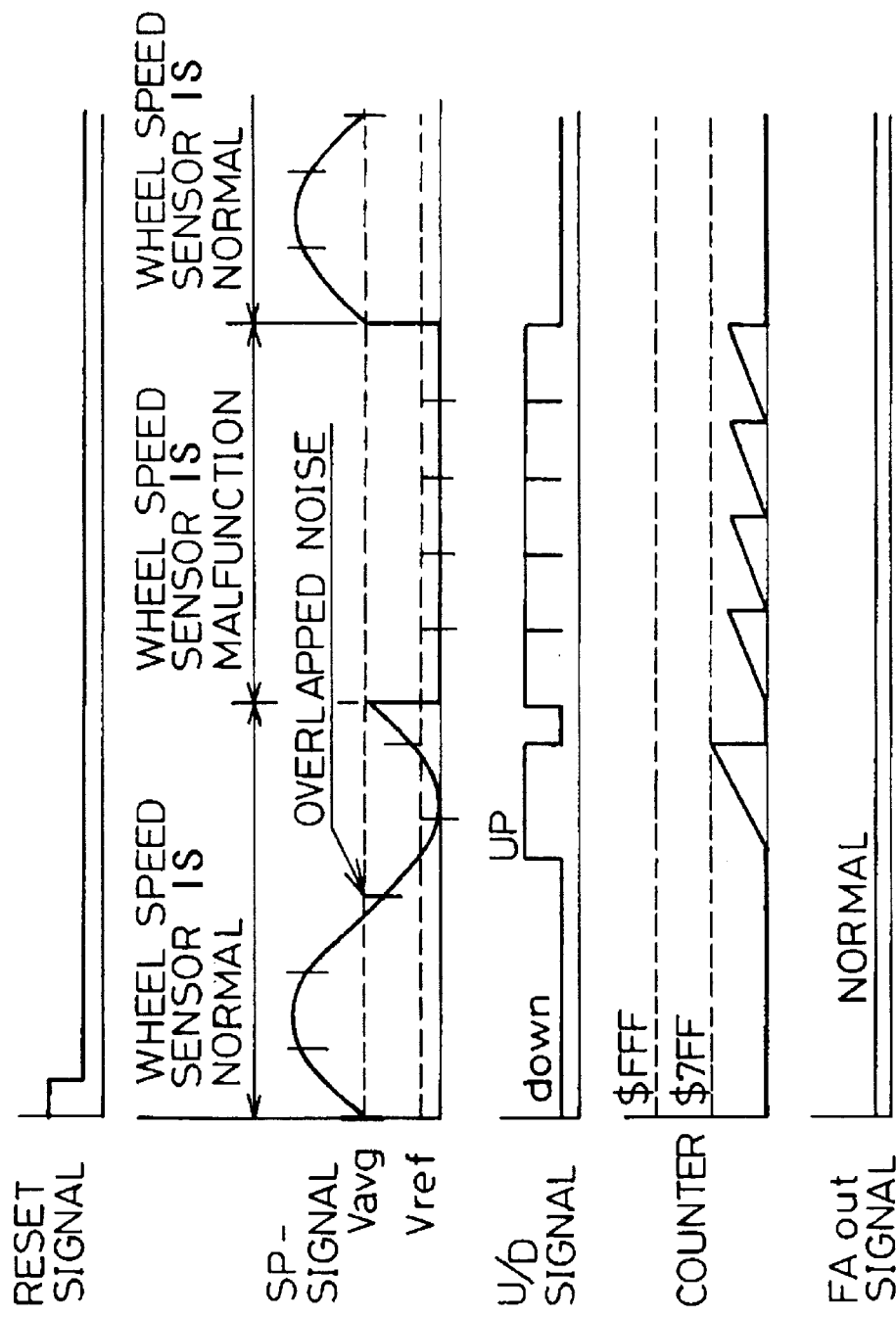
FIG. 4 is a time chart showing the signals of the malfunction detection device for a wheel speed sensor of the present invention when a noise signal is laid on the wheel speed signal.
Figure 5:
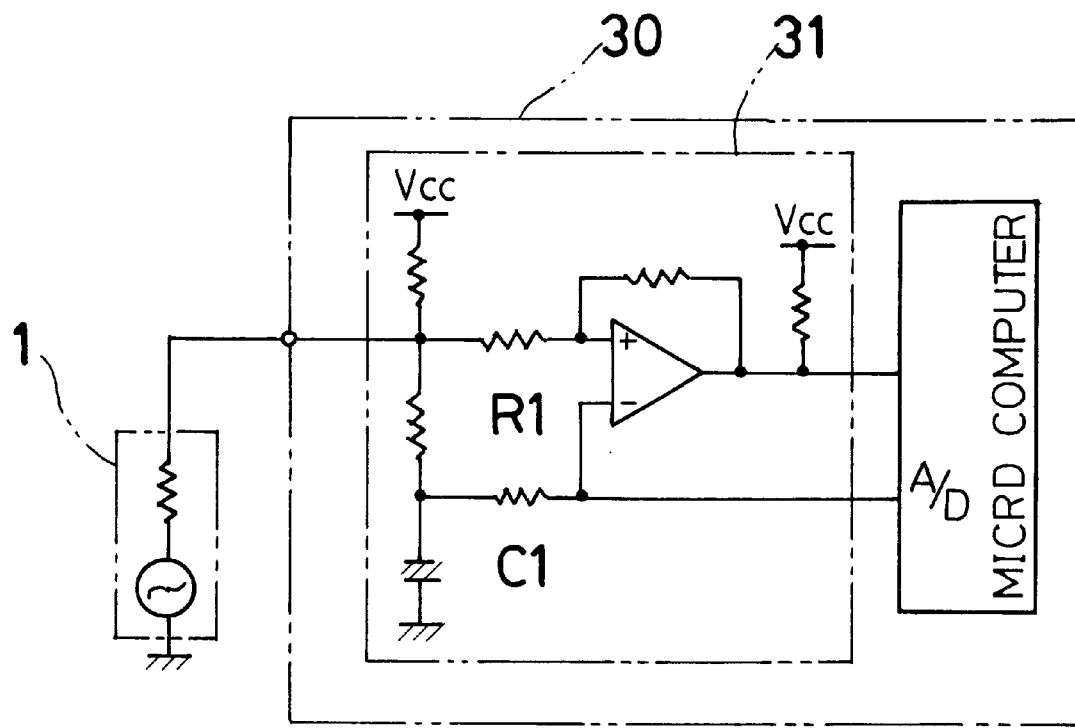
FIG. 5 is a circuit diagram of the malfunction detection device for a wheel speed sensor of the prior art.

A method of malfunction detection of a wheel speed sensor where the counter value of the calculation circuit IC5 is instantly initialized to $0 when the voltage at the terminal Sp− reaches the voltage Vref is known. However, in accordance with the above method, as shown in FIG. 4 when noise signals (e.g. an ignition noise, a noise caused by a turn signal or an electric horn of the vehicle and so on) are laid on the voltage at the terminal Sp−, a malfunction of the wheel speed sensor 1 can not be detected even though the wheel speed sensor 1 is under the malfunction condition.

In accordance with the above description, the malfunction of the speed sensor 1 s a result of a cut coil wire of the wheel speed sensor 1 is mainly described. In the case of a short circuit of the coil wire of the wheel speed sensor 1 (e.g. a contact of the wire coil of the wheel speed sensor 1 to a vehicle body), since the voltage at the terminal Sp− is pulled down to 0 V, the malfunction detection device for a wheel speed sensor of the present invention operates the same as it does in the case of a cut coil wire of the wheel speed sensor 1.

With regard to the present invention, a first predetermined voltage value Vref1 which is lower than the average voltage Vavg and a second predetermined voltage value Vref2 which is higher than the voltage value Vavg may be provided in order to detect a short circuit of the coil wire of the wheel speed sensor 1 to a +terminal of the power supply and a cut of the resistance R3 of the ABS control device.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A malfunction detection device for a wheel speed sensor comprising:
   a comparison circuit for comparing a wheel speed signal output from a wheel speed sensor with a predetermined voltage;
   a calculation circuit selectively increasing or decreasing a counter according to an output signal of the comparison circuit;
   a malfunction signal output circuit outputting a malfunction signal when the counter of the calculation circuit reaches a predetermined value; and
   wherein speeds of the increase and the decrease of the counter differ from each other.

2. A malfunction detection device for a wheel speed sensor as recited in claim 1, wherein the speed of the decrease of the counter is larger than the speed of the increase of the counter.

3. A malfunction detection method for a wheel speed sensor comprising:
   a comparison step for comparing a wheel speed signal output from a wheel speed sensor with a predetermined voltage and for outputting an output signal;
   a calculation step for selectively increasing or decreasing a counter according to the output signal;
   a malfunction signal output step for outputting a malfunction signal when the counter reaches a predetermined value;
   wherein speeds of the increase and the decrease of the counter differ from each other.

4. A malfunction detection method for a wheel speed sensor as recited in claim 3, herein the speed of the decrease of the counter is larger than the speed of the increase of the counter.

* * * * *

UNITED STATES PATENT AND TRADEMARK OFFICE
CERTIFICATE OF CORRECTION

PATENT NO. : 6,170,923 B1
DATED : January 9, 2001
INVENTOR(S) : Yutaka Iguchi et al.

It is certified that error appears in the above-identified patent and that said Letters Patent is hereby corrected as shown below:

Title page,
Item [75], Inventor, please correct the second inventor to read -- Teruaki Arata --.

Signed and Sealed this

Sixth Day of November, 2001

Attest:

*Attesting Officer*

NICHOLAS P. GODICI
*Acting Director of the United States Patent and Trademark Office*